(12) United States Patent
Boivin et al.

(10) Patent No.: US 9,669,930 B2
(45) Date of Patent: Jun. 6, 2017

(54) GALLEY CART WITH MULTI-CAPACITY SUPPORT

(71) Applicant: NORDUYN INC., Montreal (CA)

(72) Inventors: Mathieu Boivin, Montreal (CA); Martin Belanger, Montreal (CA)

(73) Assignee: Norduyn Inc., Montreal, QC (CA)

( * ) Notice: Subject to any disclaimer, the term of this patent is extended or adjusted under 35 U.S.C. 154(b) by 0 days.

(21) Appl. No.: 15/087,661

(22) Filed: Mar. 31, 2016

(65) Prior Publication Data

US 2016/0288909 A1    Oct. 6, 2016

Related U.S. Application Data

(60) Provisional application No. 62/141,570, filed on Apr. 1, 2015.

(51) Int. Cl.
| | |
|---|---|
| *B62B 3/02* | (2006.01) |
| *B64D 11/00* | (2006.01) |
| *B62B 3/00* | (2006.01) |
| *B62B 5/04* | (2006.01) |
| *E05C 1/08* | (2006.01) |
| *E05C 9/04* | (2006.01) |

(Continued)

(52) U.S. Cl.
CPC .......... *B64D 11/0007* (2013.01); *B62B 3/004* (2013.01); *B62B 3/005* (2013.01); *B62B 5/0433* (2013.01); *E05C 1/08* (2013.01); *E05C 9/046* (2013.01); *B64D 11/04* (2013.01); *E05B 13/002* (2013.01); *E05B 41/00* (2013.01); *E05B 2001/0076* (2013.01); *E05C 9/1808* (2013.01)

(58) Field of Classification Search
CPC ..... B64D 11/0007; B62B 3/004; B62B 3/005; B62B 2202/67; B62B 3/10; A47B 2031/002; B65D 19/40; B65D 21/0233; B65D 21/0234; B65D 21/0235; B65D 21/04; B65D 21/0237; B65D 21/0238; B65D 2543/00435
See application file for complete search history.

(56) References Cited

U.S. PATENT DOCUMENTS

| | | | | |
|---|---|---|---|---|
| 3,117,692 | A * | 1/1964 | Carpenter | B65D 21/0219 206/501 |
| 3,376,046 | A * | 4/1968 | Kivett | B62B 1/10 206/506 |

(Continued)

*Primary Examiner* — Hau Phan
*Assistant Examiner* — Jacob Meyer
(74) *Attorney, Agent, or Firm* — Mathieu Audet

(57) ABSTRACT

A galley cart for moving along an aisle of a vehicle is presented, the galley cart comprising a body comprising a right longitudinal portion, a left lateral portion, a rear portion disposed between the right and the left lateral portions on a rear side of the body, a door opening disposed between the right and the left lateral portions on a front side of the body, an upper portion disposed between the right and the left lateral portions, a lower portion disposed between the right and the left lateral portions, wheels attached to the lower portion for supporting the body, a door pivotally attached to the body and adapted to mate with the door opening and a locking mechanism operatively associated with the door for selectively securing the door to the body in a closed position thereof the upper portion of the cart comprising a peripheral frame including a plurality of container-supporting portions.

20 Claims, 8 Drawing Sheets

(51) Int. Cl.
  *E05B 41/00*  (2006.01)
  *E05C 9/18*   (2006.01)
  *E05B 13/00*  (2006.01)
  *E05B 1/00*   (2006.01)
  *B64D 11/04*  (2006.01)

(56) References Cited

U.S. PATENT DOCUMENTS

| | | | | |
|---|---|---|---|---|
| 3,999,775 A * | 12/1976 | Brongo | ................ | B62B 3/003 |
| | | | | 211/187 |
| 4,091,953 A * | 5/1978 | Daenen | ................ | A47J 47/02 |
| | | | | 206/514 |
| 4,093,070 A * | 6/1978 | Stahl | ................ | B65D 21/046 |
| | | | | 206/507 |
| 4,220,343 A * | 9/1980 | Robinson | ............ | A63B 47/007 |
| | | | | 206/315.9 |
| 4,828,112 A * | 5/1989 | Vollrath | ............ | B65D 21/0233 |
| | | | | 206/519 |
| 5,011,240 A * | 4/1991 | Kelley | ................ | A47B 31/00 |
| | | | | 312/249.12 |
| 5,069,466 A * | 12/1991 | Propst | ................ | A47B 31/00 |
| | | | | 211/186 |
| 5,287,966 A * | 2/1994 | Stahl | ................ | B65D 21/041 |
| | | | | 206/503 |
| 5,427,394 A * | 6/1995 | Lauto | ................ | B62B 3/02 |
| | | | | 280/33.998 |
| 6,520,514 B2 * | 2/2003 | Clegg | ................ | A45C 5/14 |
| | | | | 280/47.26 |
| 6,964,348 B2 * | 11/2005 | Breimon | ............ | B65D 21/022 |
| | | | | 206/508 |
| 7,086,551 B2 * | 8/2006 | von Holdt, Jr. | .... | B65D 21/0219 |
| | | | | 220/266 |
| 7,134,552 B1 * | 11/2006 | McDonagh | ............ | A47J 47/14 |
| | | | | 206/545 |
| 7,544,915 B2 * | 6/2009 | Hu | .................... | B62B 3/006 |
| | | | | 219/387 |
| 7,950,679 B2 * | 5/2011 | Claffy | ................ | A47J 39/006 |
| | | | | 280/47.35 |
| 8,322,530 B2 * | 12/2012 | Furlong | ............ | B65D 21/022 |
| | | | | 206/508 |
| 8,360,447 B2 * | 1/2013 | Knoppers | ............ | A47B 31/00 |
| | | | | 280/47.34 |
| 8,465,030 B2 * | 6/2013 | Boivin | ................ | B62B 3/004 |
| | | | | 280/47.34 |
| 8,596,655 B2 * | 12/2013 | Belanger | ............ | B29C 65/483 |
| | | | | 156/92 |
| 8,690,170 B2 * | 4/2014 | Belanger | ............ | B29C 70/86 |
| | | | | 280/47.34 |
| 8,777,043 B2 * | 7/2014 | Furlong | ............ | B65D 21/022 |
| | | | | 206/508 |
| 8,936,260 B2 * | 1/2015 | Burd | ................ | B62B 3/003 |
| | | | | 280/47.35 |
| 9,205,951 B1 * | 12/2015 | Roman | ............ | B65D 21/0233 |
| 2002/0175172 A1 * | 11/2002 | Diesterbeck | ....... | B65D 21/0219 |
| | | | | 220/782 |
| 2004/0112906 A1 * | 6/2004 | von Holdt, Jr. | .... | B65D 21/0233 |
| | | | | 220/657 |
| 2005/0051549 A1 * | 3/2005 | Nelson | ............ | B65D 21/0219 |
| | | | | 220/23.83 |
| 2009/0308883 A1 * | 12/2009 | Blumenschein | ... | B65D 21/0233 |
| | | | | 220/780 |
| 2010/0108556 A1 * | 5/2010 | Claffy | ................ | B65D 11/24 |
| | | | | 206/508 |
| 2010/0140890 A1 * | 6/2010 | Boivin | ................ | B62B 3/004 |
| | | | | 280/47.34 |
| 2011/0139805 A1 * | 6/2011 | Alvares | ............ | B65D 43/021 |
| | | | | 220/788 |
| 2011/0248458 A1 * | 10/2011 | Belanger | ............ | B29C 65/483 |
| | | | | 280/47.35 |
| 2011/0278879 A1 * | 11/2011 | Belanger | ............ | B29C 70/86 |
| | | | | 296/187.01 |
| 2012/0012596 A1 * | 1/2012 | Hollebone | ............ | A45C 13/36 |
| | | | | 220/694 |
| 2013/0181419 A1 * | 7/2013 | Benning | ............ | B62B 3/005 |
| | | | | 280/79.2 |
| 2015/0040606 A1 * | 2/2015 | Hernanz Arbeloa | ... | B62B 3/006 |
| | | | | 62/457.1 |

* cited by examiner

SECTION

GALLEY CART WITH MULTI-CAPACITY SUPPORT

CROSS-REFERENCE

The present invention relates to and claims priority from U.S. Provisional Patent Application No.: 62/141,570, filed Apr. 1, 2015, entitled TROLLEY DOOR LOCKING MECHANISM AND METHOD OF USE THEREOF, which is incorporated herein by reference.

FIELD OF THE INVENTION

This invention relates generally to a locking mechanism for a galley cart for moving objects. The present invention relates more precisely to a multi-capacity support for a galley cart for use in an airplane, or another vehicle.

BACKGROUND OF THE INVENTION

Galley carts are generally used in the transportation industry for moving goods and other articles. Galley carts can be used in critical environments like in the aeronautical industry and are subject to standardization and safety requirements.

Galley cart are used to transport merchandise, food, beverage and other items. These goods are packaged in containers that are coming in a plurality of shapes and sizes. It is hence desirable that the galley cart be designed to receive containers of more than one shape and size.

It is therefore desirable to provide an improved trolley cart over the existing art. It is also desirable to provide an improved container-receiving portion that would receive containers of more than one shape and size. It is equally desirable to provide a trolley cart that is not jeopardizing the stability of containers supported thereon.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, one aspect of the present invention improves at least some of the deficiencies associated with the drawbacks identified above.

It is one aspect of our work to provide, in accordance with at least one embodiment thereof, a galley cart with an improved container-supporting portion.

It is one aspect of our work to provide, in accordance with at least one embodiment thereof, a galley cart with a top portion configured for receiving containers of a plurality of sizes.

It is one aspect of our work to provide, in accordance with at least one embodiment thereof, a galley cart with a top portion including a plurality of container-supporting levels.

It is an aspect of our work to provide, in accordance with at least one embodiment thereof, a galley cart including a top portion including a contour wall that has an uneven peripheral height.

It is an aspect of our work to provide, in accordance with at least one embodiment thereof, a galley cart including a container-supporting portion made of polymer.

It is an aspect of our work to provide, in accordance with at least one embodiment thereof, a galley cart including an extruded container-supporting portion.

It is an aspect of our work to provide, in accordance with at least one embodiment thereof, a drawer portion for receiving a cold medium therein to cool the galley cart interior.

These and other advantages and features of the present invention will become apparent from the following description and the attached drawings.

BRIEF DESCRIPTION OF THE DRAWINGS

FIG. 1 B) is a right elevation view of a galley cart in accordance with at least an embodiment of the present invention;

FIG. 1 C) is a section view of a galley cart in accordance with at least an embodiment of the present invention;

FIG. 1 D) is a magnified partial section view of a galley cart in accordance with at least an embodiment of the present invention;

FIG. 2 B) is a right elevation view of a galley cart, with a first size container, in accordance with at least an embodiment of the present invention;

FIG. 2 C) is a section view of a galley cart, with a first size container, in accordance with at least an embodiment of the present invention;

FIG. 2 D) is a magnified partial section view of a galley cart, with a first size container, in accordance with at least an embodiment of the present invention;

FIG. 3 B) is a right elevation view of a galley cart, with a second size container, in accordance with at least an embodiment of the present invention;

FIG. 3 C) is a section view of a galley cart, with a second size container, in accordance with at least an embodiment of the present invention;

FIG. 3 D) is a magnified partial section view of a galley cart, with a second size container, in accordance with at least an embodiment of the present invention;

FIG. 4 B) is a magnified partial section view of a galley cart, with a second size container, in accordance with at least an embodiment of the present invention;

FIG. 13 is a magnified partial perspective view of a galley cart of FIG. 12 in accordance with at least an embodiment of the present invention.

DESCRIPTION OF EMBODIMENT(S) OF THE INVENTION

Figure 1:
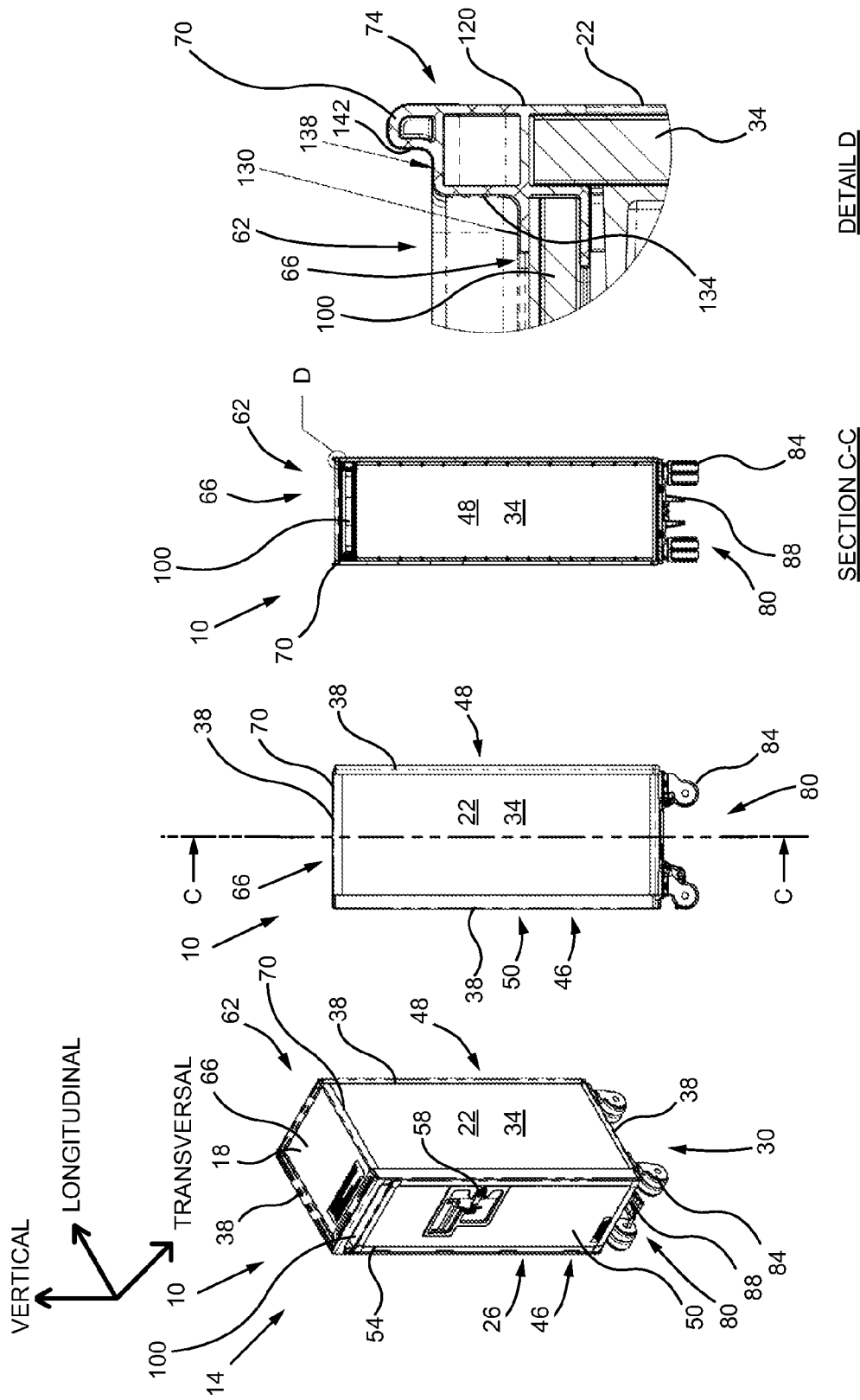
FIG. 1 A) is a perspective view of a galley cart in accordance with at least an embodiment of the present invention.
Figure 2:
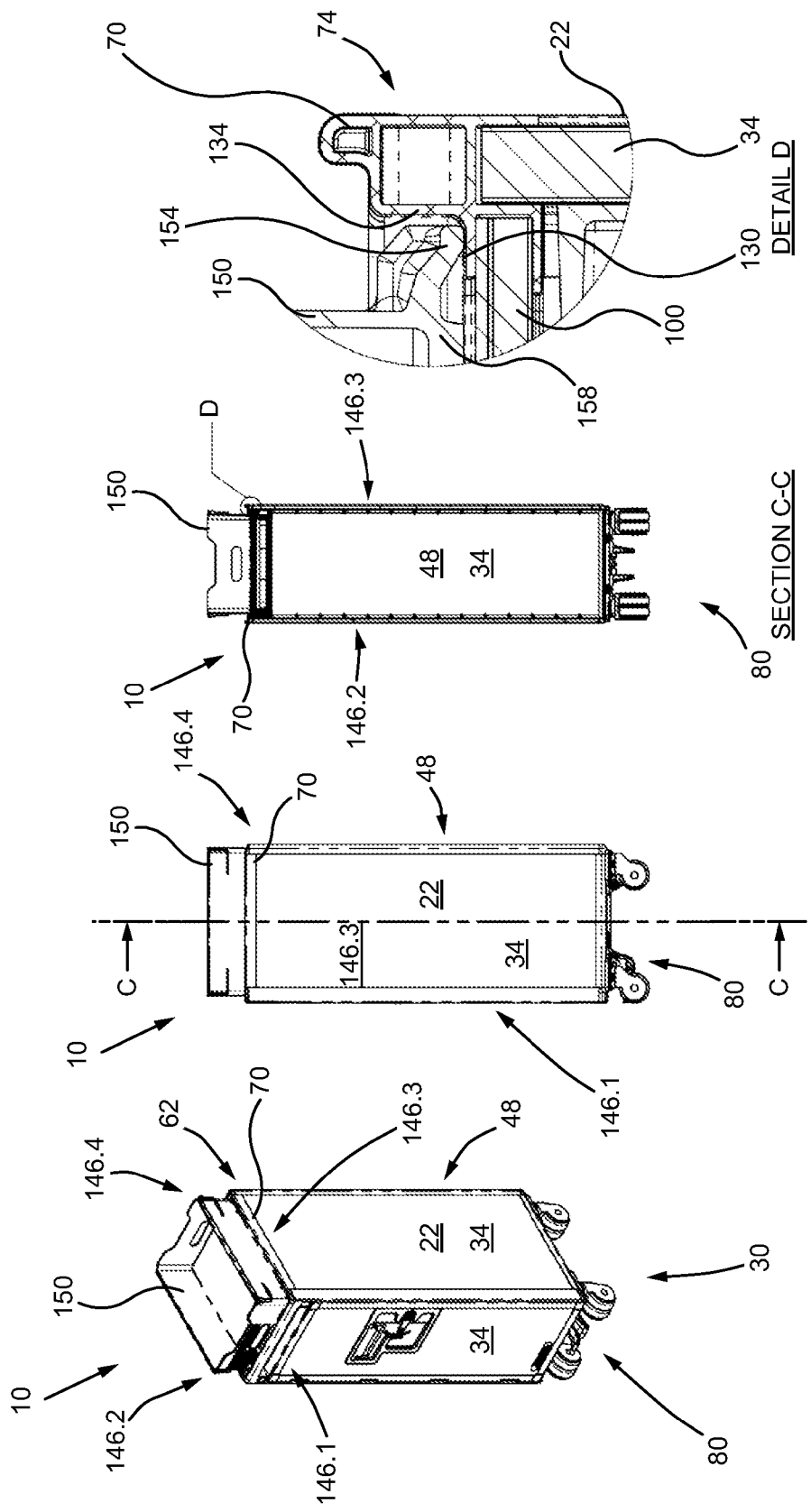
FIG. 2 A) is a perspective view of a galley cart, with a first size container, in accordance with at least an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in schematic form in order to facilitate describing the present invention.

A galley cart 10 adapted to carry goods in accordance with an embodiment of the invention is illustrated in FIG. 1. The galley cart 10 is adapted to be used in a passenger airplane but could alternatively be used in other environments like in a passenger train or, inter alia, in the medical field. The galley cart 10 illustrated in FIG. 1 comprises a body 14 defining an upper portion 18, a right longitudinal portion 22, a left longitudinal portion 26 and a bottom portion 30. The body 14 can be described as an assembled construction using panels 34 and junction members 38 therebetween simultaneously supplying the aesthetic envelope of the galley cart 10 and the structure providing its mechanical strength.

The upper portion 18, the right longitudinal portion 22, the left longitudinal portion 26 and the bottom portion 30 of the body 14 are connected together to obtain a strong unified structure in accordance with an embodiment. Alternatively, the upper portion 18, the right longitudinal portion 22, the left longitudinal portion 26 and the bottom portion 30 of the body 14 are connected together with intervening junction members 38. Illustrative embodiments described herein are using a variety of junction members 38 to interconnect adjacent portions 18, 22, 26, 30. The body 14 of the illustrated embodiment is forming a cavity having four planar side portions 18, 22, 26, 30. The cart 10 can be embodied in a single door 50 configuration and consequently includes a rear transversal portion 48, in contrast, the cart 10 can also be embodied in a double doors 50 configuration (not illustrated) without departing from the scope of the present specification. A door 50 is pivotally secured with the hinge 54 to the body 14 and is moveable between opened position and a closed position closing a corresponding door opening 46. The door 50 is configured to be secured to the door opening 46 with a locking mechanism 58 that can be selectively actuated by user to secure the door 50 to the door opening 46 and to open the door 50 to get access to content therein. It can be appreciated that the wall thickness of the different portions 18, 22, 26, 30 can have different thicknesses adapted to sustain the specific mechanical loads applied thereto. In other words, the construction of the galley cart 10 can be optimized to only use the required material at the right place and therefore reduces the weight while providing the appropriate mechanical resistance. For example, the panel of the upper portion 18 can have a thinner wall section than the panel of the bottom portion 30 because the upper portion 18 does not bear the weight of the entire galley cart 10. Additional details about the construction of the body 14 will be provided below.

Still referring to FIG. 1, the galley cart 10 includes a cover member 62 at least partially made of molded plastic to cover the upper portion 18 of the body 14. The cover member 62 is defining a substantially planar work area 66 defined by a peripheral frame 70 configured to prevent objects to slide off the upper portion 18 of the body 14. The work area 66 is equipped to receive containers 150, 160 thereon.

The bottom portion 30 rests on a wheelbase 80 adapted to pivotally secure thereto a set of four (4) of caster wheels 84. Two pedals 88 are also pivotally secured to the wheelbase 80 to selectively lock or unlock the caster wheels 84 to immobilize the galley cart 10 when required.

An optional tablet 100 is optionally secured inside the body 14, adjacent to the upper portion 18. The tablet 100 is moveable between a closed position 104 and an opened position (not illustrated). The tablet 100, in the closed position 104, is housed in the body 14 and does not extend outside the body 14 to fit in a corresponding galley (not illustrated). A locking mechanism 112 prevents the tablet 100 to extend when undesired. A handle (not visible in the Figures) is affixed to, or built in the extendable tablet 100 and is more accessible when the extendable tablet 100 is slightly extended.

It can be appreciated from FIG. 1 D) the work area 66 is bordered with the peripheral frame 70 to help secure the goods located on the work area 66 of the cart 10. The peripheral frame 70 is embodied as an extrusion 120 made of aluminum or plastic material. The peripheral frame 70, in the present embodiment, is shaped to provide a plurality of container-supporting portions 74 that includes a low support portion 130, a low contour portion 134, a high support portion 138 and a high contour portion 142. The low support 130 is contoured by the low contour portion 134 on the four sides of the galley 10. Hence, a first size container 150 can be removably supported by the upper portion 18 and laterally secured by the low contour portion 134 on the four sides 146.1, 146.2, 146.3 and 146.4 of the galley 10. Generally, first size containers 150 includes first size supports 154 disposed on its low lateral edges 168. The supports 154 are supported by the low support portion 130. One can appreciate the plurality of container-supporting portions are embodied as a plurality of container-supporting levels above the work area 66.

Figure 3:
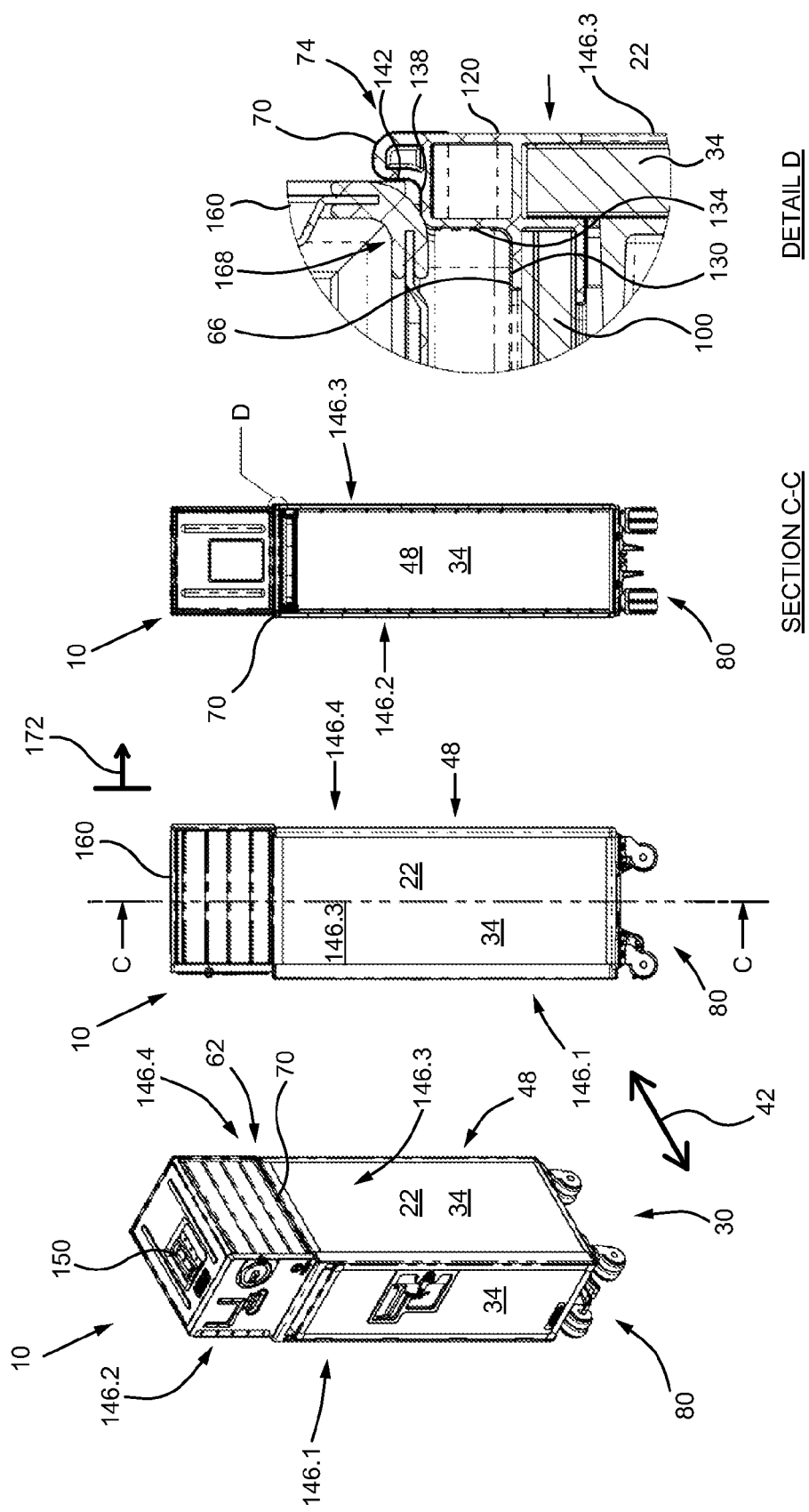
FIG. 3 A) is a perspective view of a galley cart, with a second size container, in accordance with at least an embodiment of the present invention.
Figure 4:
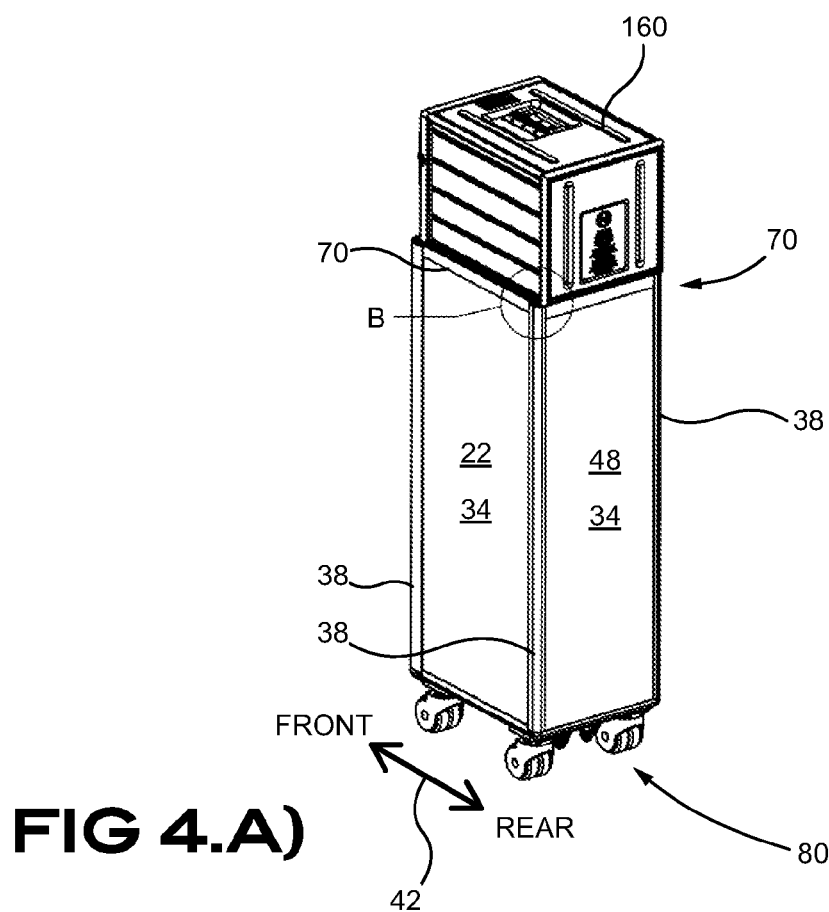
FIG. 4 A) is a perspective view of a galley cart, with a second size container, in accordance with at least an embodiment of the present invention.
Figure 4:
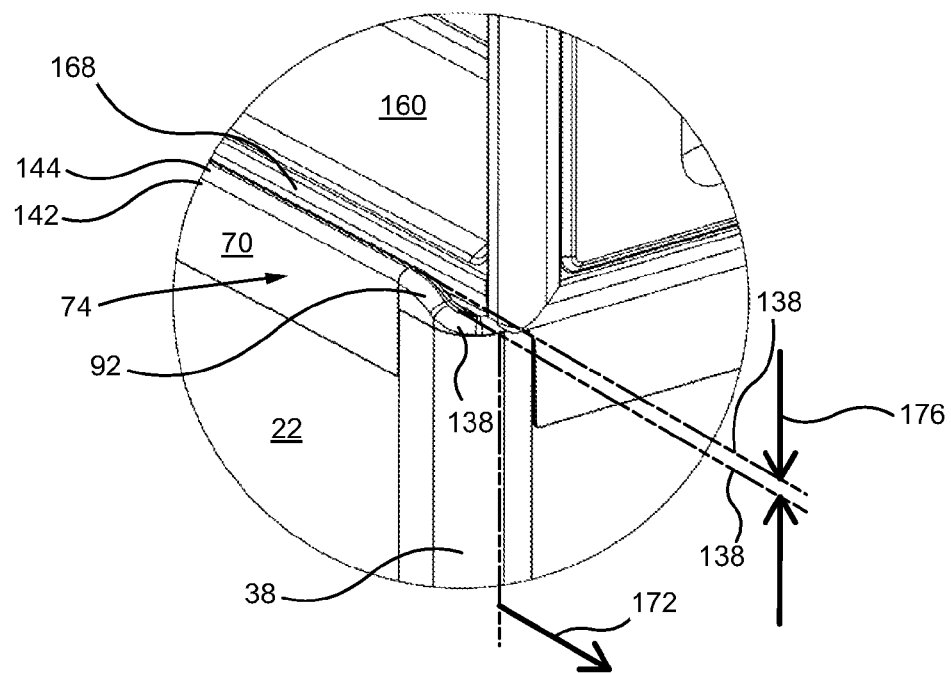

In reference now to FIG. 3 and FIG. 4, it is depicted the high support portion 138 of the peripheral frame 70 is contoured by the high contour portion 142 on three sides of the galley 10. Hence, a second size container 160, longer than the first size container 150, extending 172 beyond the longitudinal length 42 of the cart 10, is required to extend over the peripheral frame 70 to rest, on the high support portion 138. The second size container 160 can hence be removably supported by the upper portion 18 and laterally secured by the high contour portion 142 on three sides 146.1, 146.2 and 146.3 of the cart 10.

In one configuration, a single side 146 of the high contour portion 142 is removed and the contour is leveled 176 to the height of the high support portion 138. In the illustrated embodiment, the rear high contour portion 142 at the rear of the body 14 has been reduced/removed. This way, the second size container 160, longer than the longitudinal length 42 of the work area 66, can extend beyond the peripheral frame 70 while be housed along and horizontally secured on three sides 146.1, 146.2 and 146.3 of the cart 10. Generally, second size containers 160 include second size supports 164 thereon disposed on its low lateral edges 168. The supports 164 are sized and designed to contact the high support portion 138 to secure the second size container 160 on the cart 10.

One can appreciate in the illustrated embodiments that the low support portion 130 is substantially levelled with an upper surface of the work area 66, the low contour portion 134 is substantially perpendicular to the upper surface of the work area 66, the high support portion 138 is substantially perpendicular to low contour portion 134 and generally aligned with a virtual vertical projection of the panel 34 and the high contour portion 142 is substantially perpendicular to high support portion 138 and substantially aligned with a virtual vertical projection of the panel 34. Connections between adjacent supports and contour portions preferably include an intervening radius.

The first size container 150 is laterally bordered and held by the low contour portion 134 over its four sides, while the second size container 160 is laterally bordered and held by the high contour portion 142 over three of the four sides. In the latter situation, the second size container 138 can be slidably mounted on the high support portion 138 and be pushed and slide rearward to allow access to the volume under the second size container 160 to the work area 66. Alternatively, the second size container 160 can be equipped with a locking mechanism holding it in a desired position on its container-supporting portion 74. Referring more precisely to FIG. 3 D), it can be seen the high support portion 138 is a little higher than the bottom surface 180 of the second size container 160.

The illustrated cart 10, in reference with FIG. 4, includes a pair of junction members 38 disposed vertically between the rear transversal portion 48 and the right longitudinal portion 22 and between the rear transversal portion 48 and the left longitudinal portion 26, the junction members 38 including an upper portion 92 thereof transitioning between the uppermost portion 144 of the peripheral frame 70 and a height of the high support portion 138.

Figure 5:
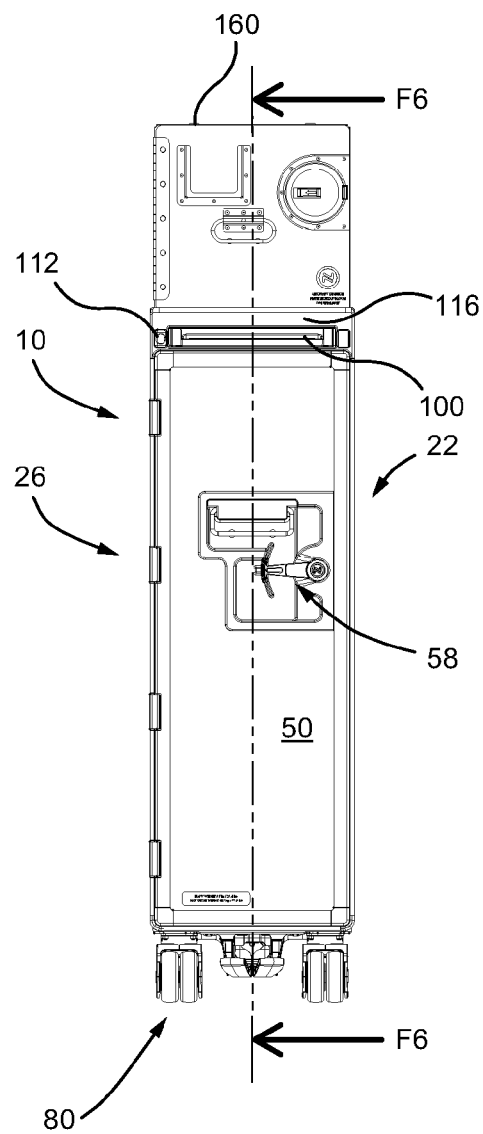
FIG. 5 is front elevation view of a galley cart, with a second size container, in accordance with at least an embodiment of the present invention.
Figure 6:
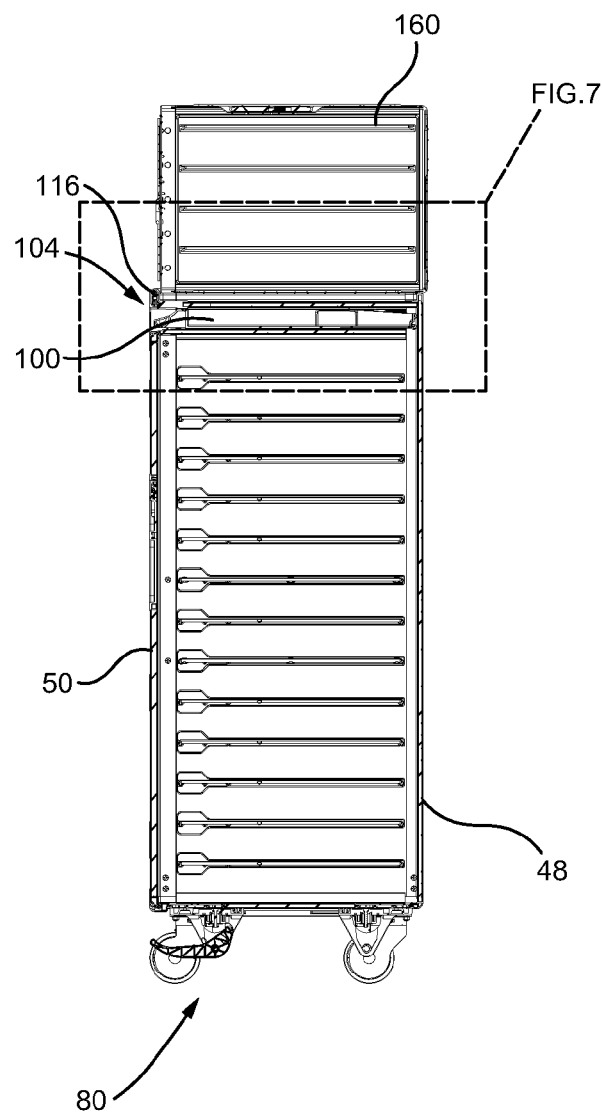
FIG. 6 is a right side elevation view of a galley cart, with a second size container, in accordance with at least an embodiment of the present invention.
Figure 7:
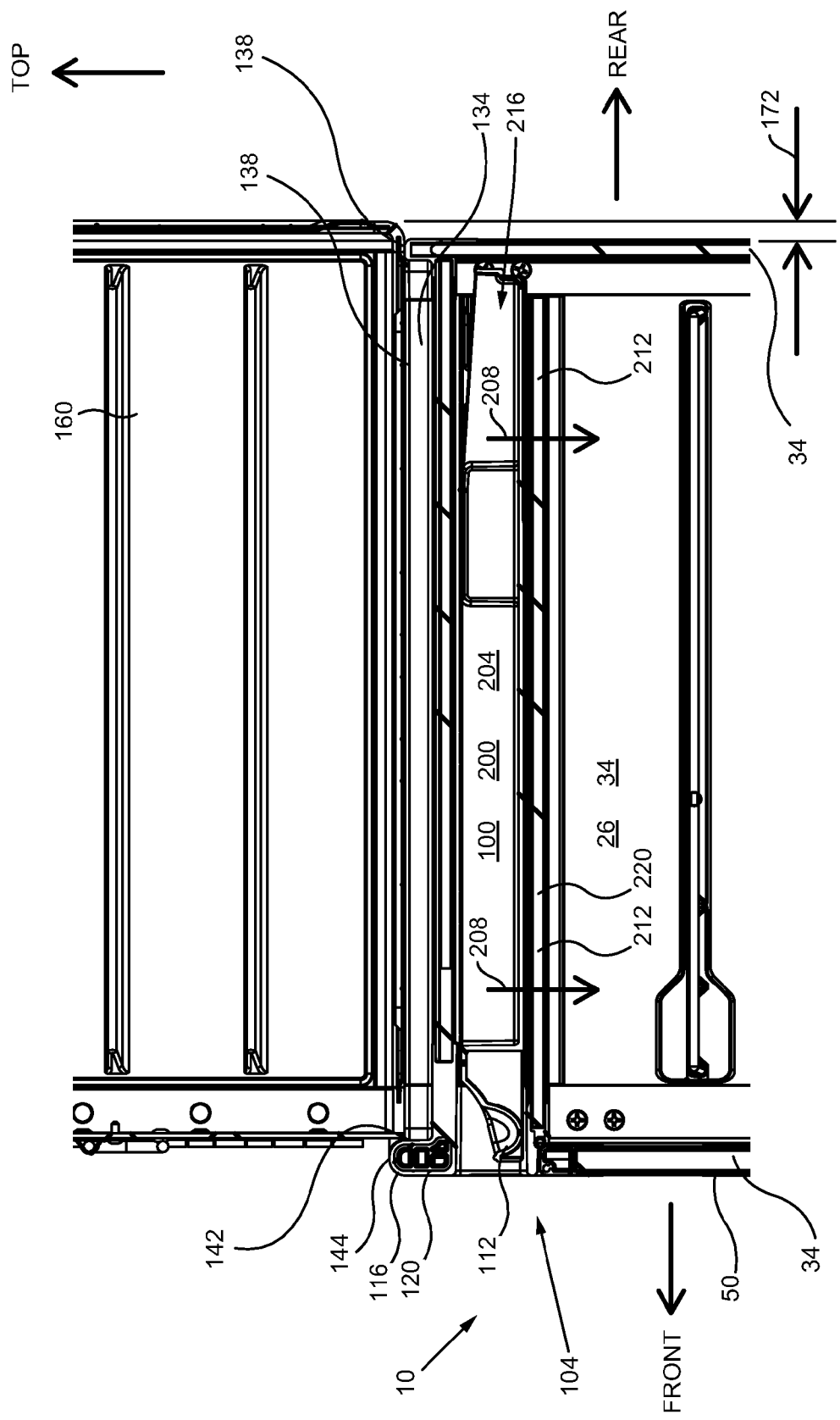
FIG. 7 is a magnified partial section view of the galley cart of FIG. 6, with a second size container, in accordance with at least an embodiment of the present invention.

It can be seen in FIG. 5, FIG. 6 and FIG. 7 the handle 116 is used to move and steer the cart 10. The handle 116 is also retaining the second size container 160 on its forward portion used as a section of the high contour portion 142.

Figures 8, 9:
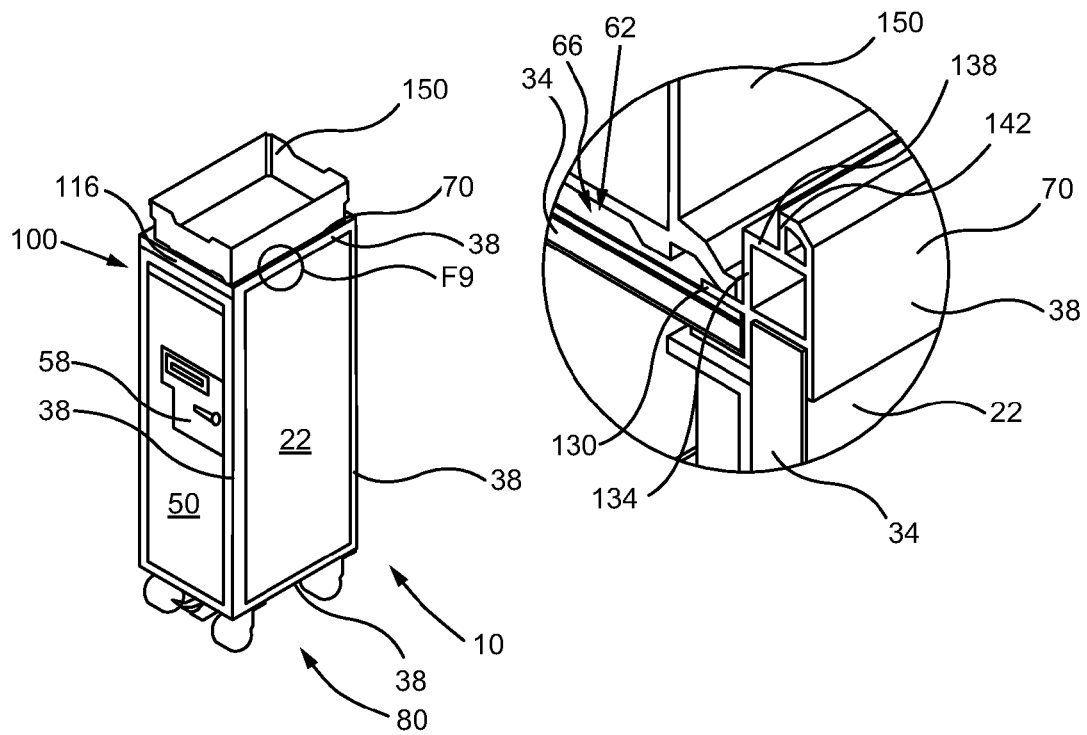
FIG. 8 is a perspective view of a galley cart, with a first size container, in accordance with at least an embodiment of the present invention.
FIG. 9 is a magnified partial perspective view of a galley cart of FIG. 8, with a first size container, in accordance with at least an embodiment of the present invention.
Figures 10, 11:
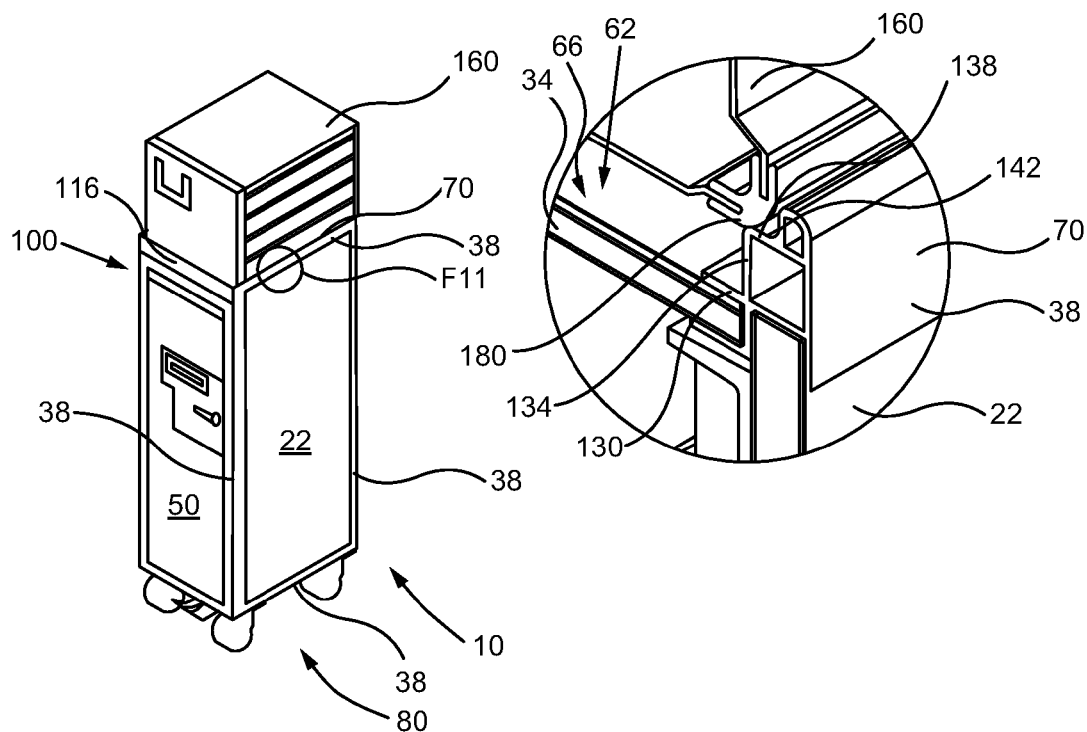
FIG. 10 is a perspective view of a galley cart, with a second size container, in accordance with at least an embodiment of the present invention.
FIG. 11 is a magnified partial perspective view of a galley cart of FIG. 9, with a second size container, in accordance with at least an embodiment of the present invention.
Figures 12, 14:
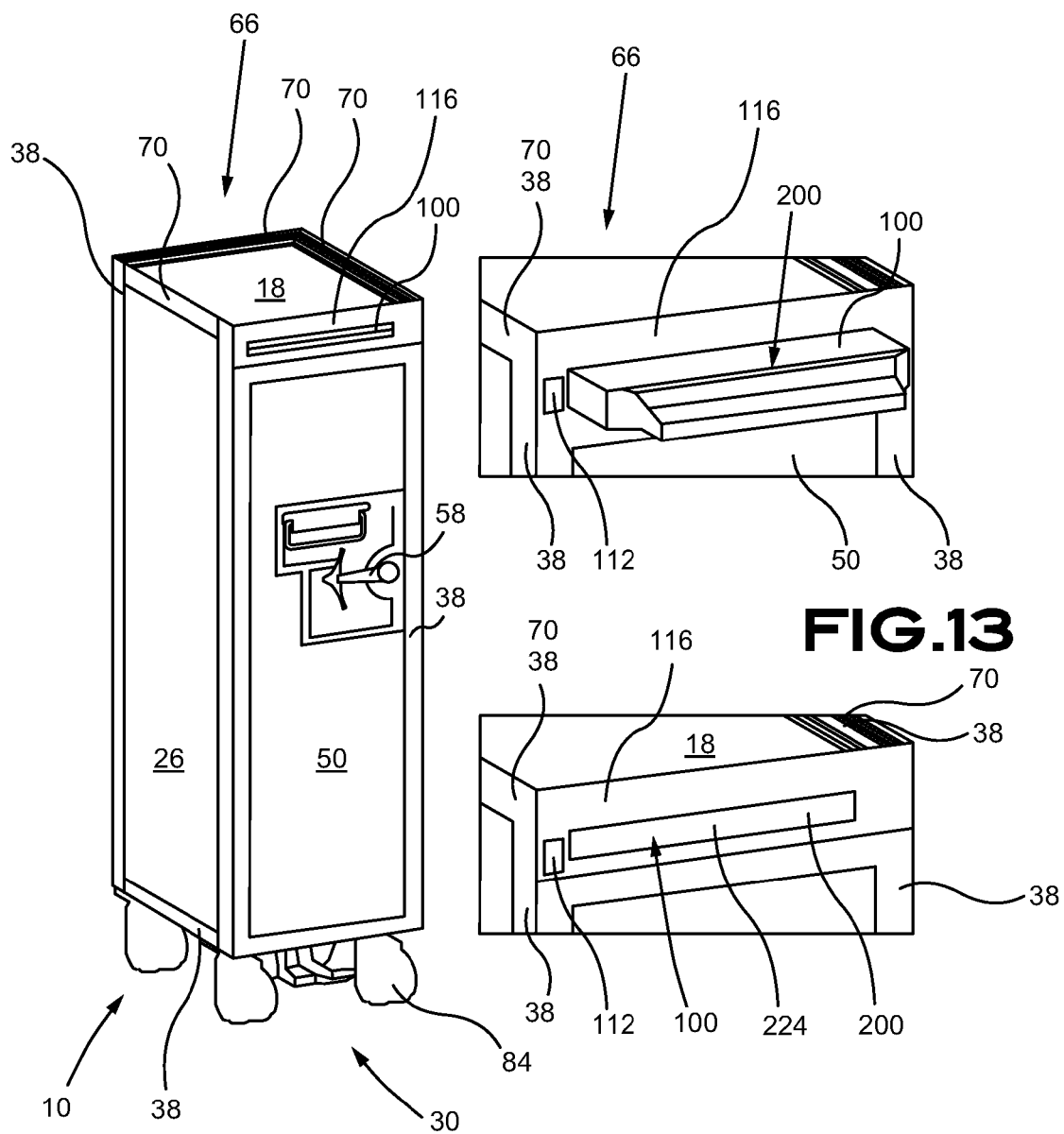
FIG. 12 is a perspective view of a galley cart in accordance with at least an embodiment of the present invention.
FIG. 14 is a magnified partial perspective view of a galley cart of FIG. 12 in accordance with at least an embodiment of the present invention.

FIG. 8 and FIG. 9 are illustrating from a different angle the cooperation between the first size container 150 and the peripheral frame 70 of the cart 10. It is also possible to appreciate from a different angle the cooperation between the second size container 160 and the peripheral frame 70 of the cart 10.

Finally, in reference with FIG. 7, FIG. 12, FIG. 13 and FIG. 14, the tablet 100 can be replaced by, or be used as an ice tray 200 for cooling the content of the cart 10. Cold medium, such a dry ice, can be added in the tablet 100 (that can include a cavity and could alternatively be referred to as a drawer 204) and cold is going to naturally get down 208 through cooling openings 212 performed in the tablet compartment 216 floor 220 between the upper portion 18. A dry-ice pack 224 can replace the tablet 100 or the drawer 204.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A galley cart for moving along an aisle of a vehicle, the galley cart comprising:
   a body comprising
   a right longitudinal portion;
   a left longitudinal portion;
   a rear transversal portion disposed between the right and the left longitudinal portions on a rear side of the body;
   a front transversal portion disposed between the right and the left longitudinal portions on a front side of the body;
   a door opening disposed between the right and the left longitudinal portions on the front side of the body;
   an upper portion disposed between the right and the left longitudinal portions;
   a lower portion disposed between the right and the left longitudinal portions;
   wheels attached to the lower portion for supporting the body;
   a door pivotally attached to the body and adapted to selectively close the door opening; and
   a locking mechanism operatively associated with the door for selectively securing the door to the body in a closed position thereof,
   the upper portion of the cart comprising a peripheral frame including
   a pair of longitudinal low support portions,
   a pair of transversal low support portions,
   a pair of longitudinal low contour portions, and
   a pair of transversal low contour portions defining a first container-supporting portion adapted to receive a first size container contained within the peripheral frame,
   the peripheral frame further including
   a pair of longitudinal high support portions,
   a pair of transversal high support portions,
   a pair of longitudinal high contour portions, and
   a single transversal high contour portion defining a second container-supporting portion adapted to receive a second size container longitudinally extending over the peripheral frame.

2. The galley cart of claim 1, wherein the first container-supporting portion is transversally narrower than the second container-supporting portion.

3. The galley cart of claim 2, wherein the first container-supporting portion is vertically lower than the second container-supporting portion.

4. The galley cart of claim 2, wherein the plurality of container-supporting portions are substantially vertically superposed.

5. The galley cart of claim 2, wherein the first container-supporting portion is generally within the periphery of the second container-supporting portion.

6. The galley cart of claim 2, wherein the peripheral frame includes an hollowed portion therein generally disposed below the second container supporting portion.

7. The galley cart of claim 2, wherein the second container-supporting portion is adapted to receive therein a second size container that includes a length thereof that is longitudinally longer than the longitudinal length of the body.

8. The galley cart of claim 2, wherein the second container-supporting portion is adapted to secure therein a second size container in a position adjacent and parallel with the upper portion of the body and extending over the rear transversal portion of the body.

9. The galley cart of claim 1, wherein an uppermost portion of the peripheral frame is progressively merging down with a low support portion.

10. The galley cart of claim 1, wherein a sidewall of a second size container is substantially vertically aligned with a projection of a core of a longitudinal composite wall portion when the cart is used in conjunction with a second size container.

11. A peripheral frame for an upper portion of a galley cart for moving along an aisle of a vehicle, the galley cart comprising:
a body comprising
a right longitudinal portion;
a left longitudinal portion;
a rear transversal portion disposed between the right and the left longitudinal portions on a rear side of the body;
a front transversal portion disposed between the right and the left longitudinal portions on a front side of the body;
a door opening disposed between the right and the left longitudinal portions on the front side of the body;
an upper portion disposed between the right and the left longitudinal portions;
a lower portion disposed between the right and the left longitudinal portions;
wheels attached to the lower portion for supporting the body;
a door pivotally attached to the body and adapted to selectively close the door opening; and
a locking mechanism operatively associated with the door for selectively securing the door to the body in a closed position thereof,
the peripheral frame of the cart comprising
a first container supporting portion including
a pair of low support portions and a pair of low contour portions along two transversal sides and two longitudinal sides of the peripheral frame,
a second container supporting portion including a pair of high support portions along two transversal sides and two longitudinal sides of the peripheral frame, and a high contour portion along a front transversal side and two longitudinal sides of the peripheral frame, the first container supporting portion being adapted to secure therein a first size container, the second container supporting portion being adapted to secure therein a second size container larger than the first size container that is extending over a rear transversal side of the peripheral frame.

12. The peripheral frame of claim 11, wherein the first container-supporting portion is transversally narrower than the second container-supporting portion.

13. The peripheral frame of claim 12, wherein the first container-supporting portion is vertically lower than the second container-supporting portion.

14. The peripheral frame of claim 12, wherein the plurality of container-supporting portions are substantially vertically superposed.

15. The peripheral frame of claim 12, wherein the first container-supporting portion is generally within the periphery of the second container-supporting portion.

16. The peripheral frame of claim 12, wherein the peripheral frame includes an hollowed portion therein generally disposed below the second container supporting portion.

17. The peripheral frame of claim 12, wherein the second container-supporting portion is adapted to receive therein a second size container that includes a length thereof that is longitudinally longer than the longitudinal length of the body.

18. The peripheral frame of claim 12, wherein the second container-supporting portion is adapted to secure therein a second size container in a position adjacent and parallel with the upper portion of the body and extending over the rear transversal portion of the body.

19. The peripheral frame of claim 11, wherein an uppermost portion of the peripheral frame is progressively merging down with a low support portion.

20. The peripheral frame of claim 11, wherein a sidewall of a second size container is substantially vertically aligned with a projection of a core of a longitudinal composite wall portion when the cart is used in conjunction with a second size container.

* * * * *